C. POLLEY.
Straw Cutter.
No. 55,703. Patented June 19, 1866.
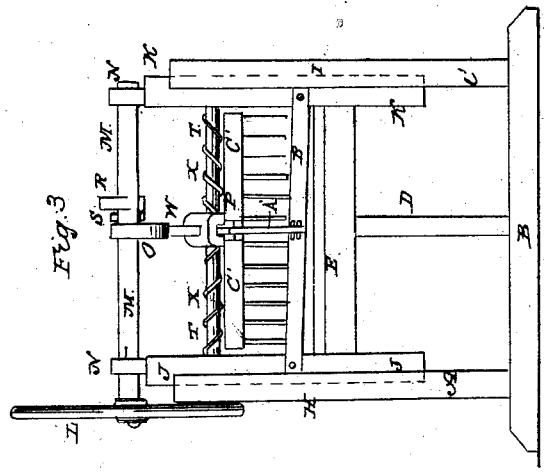
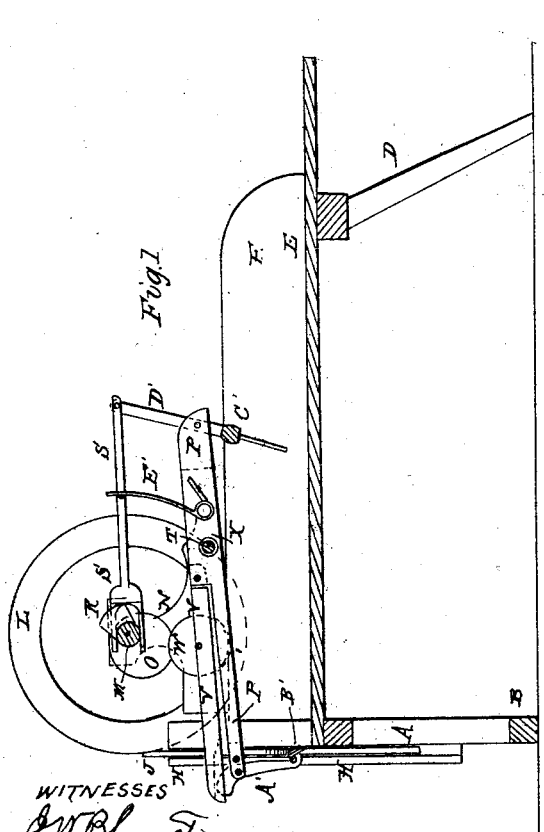
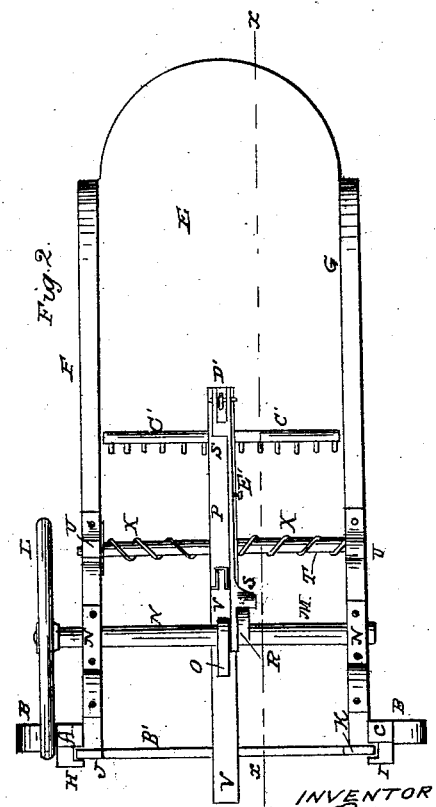

UNITED STATES PATENT OFFICE.

CLARK POLLEY, OF SINKING SPRINGS, OHIO.

IMPROVEMENT IN STRAW-CUTTERS.

Specification forming part of Letters Patent No. 55,703, dated June 19, 1866.

*To all whom it may concern:*

Be it known that I, CLARK POLLEY, of Sinking Springs, Highland county, State of Ohio, have invented a new and useful Improvement in Straw-Cutters; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved straw-cutter, taken through the line *x x*, Fig. 2. Fig. 2 is a top or plan view of the same. Fig. 3 is a front-end view of the same.

Similar letters of reference indicate like parts.

My invention has for its object to furnish an improved straw-cutter so constructed that the knife shall be forced up against the bed-plate, while making the cut, by direct pressure, thus compelling it to make a clean cut; and it consists, first, of a set of levers in combination with each other, with the knife and sliding frame, and with the walking-beam and driving-cam; second, in the combination of a spring with the shaft and walking-beam, for the purpose of raising the knife after making the cut; and, third, in the combination of the connecting-bar, lever, and feed-rake with each other and with the cam, spring, and walking-beam, for the purpose of feeding the straw forward to the knife, the whole being constructed and arranged as hereinafter more fully described.

A, B, and C is the frame that supports the forward end of the machine, and D is the foot that supports its rear end. E is the bottom, and F and G the sides, of the box. H and I are pieces attached to the forward side of the frame A C, as shown in Figs. 1, 2, and 3, and in which are formed the grooves in which the sash-frame J K slides. L is the crank-wheel by which motion is communicated to the machine. This wheel L is attached to the end of the shaft M, which revolves in bearings N, attached to the upper edges of the side board, F and G, as shown in Fig. 2. Upon this shaft are formed two cams, one of which, O, operates the walking-beam P, and the other, R, operates the connecting-bars S, as hereinafter described.

The walking-beam P is attached to a shaft, T, which works in bearings U, attached to the upper edges of the sides F and G of the box, as shown in Figs. 1 and 2.

To the upper side of the walking-beam P is pivoted one end of a lever, V. This lever lies along the upper side of the walking-beam P, as shown in Fig. 1.

W is a friction-wheel working in a slot formed in the rear part of the lever V, and extending down into a groove formed in the upper part of the walking-beam P for its reception. This wheel revolves in bearings in the upper part of the lever V, as shown in Fig. 1.

The forward ends of the walking-beam P and lever V are forced down by the cam O coming in contact with the friction-wheel W, and they are raised again by the action of the spring X, which is coiled about the shaft T, to which the said walking-beam is pivoted, and is connected with the said walking-beam and with the sides of the box.

A' is a connecting rod or lever, the lower end of which is pivoted to knife B' or to a cross-bar of the sash-frame J K. This lever A' is also pivoted near its upper end to the forward end of the walking-beam P, and its upper end, which is made curved, rests in a groove formed in the under side of the forward end of the lever V, as shown in Fig. 1.

It will be observed that the point at which the lever A' is pivoted to the walking-beam P is in front of the vertical line which passes through the point at which said lever is pivoted to the knife B', and in the rear of the vertical line that passes through the point of contact between the said lever and the lever V, as seen in Fig. 1.

By this construction and arrangement, when the knife-frame is forced down by the action of the cam O the pressure upon the knife is both downward and inward, forcing the said knife close up against the bed-plate of the box and insuring a clean cut.

C' is the feed rake or fork, and D' is the lever that supports and operates it. The lever D' is pivoted to the rear end of the walking-beam P, near the rake C', and its upper end is pivoted to the end of the connecting-rod S. The forward end of the connecting-rod S is forked and rides upon the shaft M in contact with the cam R. By this cam the connecting-rod S is pushed back at every revolution of the shaft M. This pushes back the upper end of the lever D', causing the rake C' to advance, forcing forward the straw into position for another cut. The connecting-rod S, when released from the cam R, is again forced forward by the spring E', so as to be in position to be again operated by the said cam R.

I claim as new and desire to secure by Letters Patent—

1. The levers A' and V, in combination with each other, with the knife B, and sash-frame J K, and with the walking-beam P and driving-cam O, the whole being constructed and arranged substantially as described, and for the purpose set forth.

2. The combination of the spring X with the shaft T and walking-beam P, substantially as described, and for the purpose set forth.

CLARK POLLEY.

Witnesses:
WILSON McCLURE,
THOS. W. McCLURE.